US008990576B2

(12) United States Patent
Jakobsson

(10) Patent No.: US 8,990,576 B2
(45) Date of Patent: Mar. 24, 2015

(54) METHODS AND APPARATUS FOR EFFICIENT COMPUTATION OF ONE-WAY CHAINS IN CRYPTOGRAPHIC APPLICATIONS

(71) Applicant: Bjorn Markus Jakobsson, Mountain View, CA (US)

(72) Inventor: Bjorn Markus Jakobsson, Mountain View, CA (US)

( * ) Notice: Subject to any disclaimer, the term of this patent is extended or adjusted under 35 U.S.C. 154(b) by 0 days.

(21) Appl. No.: 13/940,670

(22) Filed: Jul. 12, 2013

(65) Prior Publication Data

US 2013/0311787 A1 Nov. 21, 2013

Related U.S. Application Data

(63) Continuation of application No. 13/302,238, filed on Nov. 22, 2011, now Pat. No. 8,516,262, which is a continuation of application No. 12/131,404, filed on Jun. 2, 2008, now Pat. No. 8,086,866, and a (Continued)

(51) Int. Cl.
*H04L 9/32* (2006.01)
*G06F 21/60* (2013.01)

(52) U.S. Cl.
CPC .............. *G06F 21/602* (2013.01); *H04L 9/3236* (2013.01); *H04L 2209/38* (2013.01)
USPC .............................. 713/181; 380/28; 713/193

(58) Field of Classification Search
CPC .. H04L 9/3236; H04L 2209/38; G06F 21/602
USPC ................ 713/168, 176, 177, 180, 181, 193; 380/28, 30
See application file for complete search history.

(56) References Cited

U.S. PATENT DOCUMENTS

| | | | |
|---|---|---|---|
| 5,434,919 A | 7/1995 | Chaum | ........................... 380/30 |
| 5,666,416 A | 9/1997 | Micali | |

(Continued)

FOREIGN PATENT DOCUMENTS

| | | |
|---|---|---|
| EP | 02762084 | 9/2006 |
| JP | 2000-259611 | 9/2000 |
| WO | 0108348 | 2/2001 |

OTHER PUBLICATIONS

Ylh-Chun Hu and Markus Jakobsson; Adrian Perrig, Efficient Constructions for one-way Hash Chains; Nov. 5, 2003; Carnegie Mellon University; Retrieved date Sep. 10, 2010.*

(Continued)

*Primary Examiner* — Samson Lemma
(74) *Attorney, Agent, or Firm* — Ryan, Mason & Lewis, LLP

(57) ABSTRACT

Techniques are disclosed for efficient computation of consecutive values of one-way chains and other one-way graphs in cryptographic applications. The one-way chain or graph may be a chain of length s having positions i=1, 2, . . . s each having a corresponding value $v_i$ associated therewith, wherein the value $v_i$ is given by $v_i = h(v_{i+1})$, for a given hash function or other one-way function h. An initial distribution of helper values may be stored for the one-way chain of length s, e.g., at positions given by $i = 2^j$ for $0 \leq j \leq \log_2 s$. A given one of the output values $v_i$ at a current position in the one-way chain may be computed utilizing a first helper value previously stored for another position in the one-way chain between the current position and an endpoint of the chain. After computation of the given output value, the positions of the helper values are adjusted so as to facilitate computation of subsequent output values. Advantageously, a storage-computation product associated with generation of the output values of the one-way chain has a complexity $O((\log s)^2)$.

20 Claims, 2 Drawing Sheets

Related U.S. Application Data continuation of application No. 09/969,833, filed on Oct. 3, 2001, now Pat. No. 7,404,080.

(60) Provisional application No. 60/284,001, filed on Apr. 16, 2001.

(56) References Cited

U.S. PATENT DOCUMENTS

| | | | |
|---|---|---|---|
| 5,708,712 | A | 1/1998 | Brinkmeyer et al. |
| 6,026,379 | A | 2/2000 | Haller et al. |
| 6,097,811 | A | 8/2000 | Micali |
| 6,341,273 | B1 | 1/2002 | Briscoe |

OTHER PUBLICATIONS

Don Coppersmith and Markus Jakobsson; "Almost Optimal Hash Sequence Traversal"; 2002; IBM, T.J watson Research Center, Retrieved date Sep. 10, 2010.*
Gene Itkis and Leonid Reyzin; Forward-Secure Signatures with Optimal Signing and Verifying; 2001; Boston University Computer Science Department, Retrieved date Sep. 10, 2010.*
Adrian Perrig, J.D. Tygar, Dawn Song, Ran Canetti, "Efficient Authentication and Signing of Multicast Streams over Lossy Channels," sp, p. 0056, 2000 IEEE Symposium on Security and Privacy (S&P 2000), 2000.
R.C. Merkle, "A Digital Signature Based on a Conventional Encryption Function," Proceedings of Crypto '87, pp. 369-378, 1988.
A.J. Menezes et al., "Handbook of Applied Cryptography," CRC Press, pp. 396 and 464-465, 1997.
L. Lamport, "My Writings," http://research.microsoft.com/users/lamport/pubs/pubs.html, pp. 1-58, 2001.
A. Perrig et al., "Efficient and Secure Source Authentication for Multicast," Proceedings of Network and Distributed System Security Symposium NDSS 2001, 12 pages, Feb. 2001.
A. Perrig et al., "Efficient Authentication and Signing of Multicast Streams over Lossy Channels," Proc. of IEEE Security and Privacy Symposium SP 2000, pp. 1-18, May 2000.
A. Perrig et al., "TESLA: Multicast Source Authentication Transform," Proposed IRTF draft, http://paris.lcs.berkeley.edu/~perrig, pp. 1-29, 2000.
G. Itkis et al., "Forward-Secure Signatures with Optimal Signing and Verifying," Proceedings of Crypto '01, 23 pages, 2001.
K. Pister et al., "Smart Dust: Autonomous Sensing and Communication in a Cubic Millimeter," http://robotics.eecs.berekeley.edu/~pister/SamrtDust/, 4 pages, 2001.
FIPS PUB 180-1, "Secure Hash Standard," http://www.itl.nist.gov/fipspubs/fip180-1.htm, 16 pages, 1995.
S.G. Stubblebine et al., "Fair On-Line Auctions Without Special Trusted Parties," Financial Cryptography '01, 11 pages, 2001.
A. Perrig, "The BiBa One-Time Signature and Broadcast Authentication Protocol," ACM, pp. 1-10, 2001.
C. Gilmore et al., "Secure Remote Access to an Internal Web Server," pp. 1-12, undated.
K.Q. Nguyen et al., "Digital Coins based on Hash Chain," http://csrc.nist.gov/nissc/1997/proceedings/072.pdf, pp. 1-8, 1997.
K. Suzuki et al., "Efficient Sealed-Bid Auction Using Hash Chain," http://link.springer.de/link/service/series/0558/bibs/2015/20150183.htm, 1 page, Mar. 2001.
S.-M. Yen et al., "Weighted One-Way Hash Chain and Its Applications," http://link.springer.de/link/service/series/0558/bibs/1975/19750135.htm, 1 page, Mar. 2002.
K. Q. Nguyen et al., "Micro-Digital Money for Electronic Commerce," http://www.computer.org/proceedings/acsac/8274/82740002abs.htm, 1 page, Dec. 1997.
H. Petersen et al., "MicPay: Micropayment Schemes for Correlated Payments," http://spp-ics.snf.ch/spp_ics/results/r054558_Micpay_SPPICS-proc2002.pdf, pp. 141-142, Jan. 2000.
S.-M. Yen et al., "Digital Contract Signing Using Cryptographic Hash Chains," http://www.csie.ncu.edu.tw/~yensm/techreports/1998/TR-98-9.html, 1 page, May 1998.
H. Petersen et al., "Results of the Swiss Priority Programme for Information and Communication Structures," http://www.svifsi.ch/revue/pages/issues/n001/n001SPP.pdf, pp. 64-70, Feb. 2000.
M. Lee et al., "A Micro-payment System for Multiple-Shopping," http://caislab.icu.ac.kr/paper/2002/lmh/scis2002.pdf, 6 pages, 2002.
"CS255: Cryptography and Computer Security, Programming Project #2," http://crypto.stanford.edu/~dabo/courses/cs255_winter00/project 2.ps, 6 pages, 2000.
"GO project: Service Architecture for the Nomadic Internet Users of the Future," Helsinki University of Technology, Telecommunication and Software Engineering Institute (TSE), http://www.cs.hut.fi/Opinnot/T-106.850/PMRG/k2002/Mallivastaukset$_{13}$ 5_6.pdf, 4 pages, 2002.
M. Barrie et al., "Project 2 :: BlackNet ELEC5611 :: Security Engineering," http://www.ee.usyd.edu.au/~mattb/elec5611/blacknet/project2.pdf, pp. 1-5, Sep. 2001.
"Secure Communication and Commerce," http://www.cs.tau.ac.il/~ah/Exercises/e3%20-%20cert.htm, 2 pages, 2002.
"GO for Better Life—Micropayment Methods and Techniques," http://www.cs.hut.fi/Opinnot/T-106.850/PMRG/k2002/Mikromaksu.pdf, 39 pages, Mar. 2002.
D. Malkhi et al., "Lecture 5—Uses of Hashing," www.cs.huji.ac.il/~security/Notes/hashuses. doc, 7 pages, 2002.
K. Nguyen et al., "Micro-Digital Money for Electronic Commerce," http://www.acsac.org/pastconf/1997/abstract/abstract01.html, 1 page, 1997.
K. Bicakci et al., "Infinite Length Hash Chains and Their Applications," http://216.239.53.100/search?q=cach:BIQ_Jm1ZC0YC:wetice02.jpl.nasa.gov/, 25 pages, Aug. 2002.
R. Hauser et al., "Reducing the Cost of Security in Link-State Routing," http://www.isoc.org/isoc/conferences/ndss/97/hause_sl.pdf, 12 pages, Feb. 1996.
R. Sherman, "Advanced Oracle Tuning for Scalable OLTP Environments," http://www.interealm.com/technotes/roby/oltp_tune.html, 6 pages, 2002.
"Exported Symbols," http://developer.apple.com/techpubs/mac/runtimehtml/RTArch-100.html, 6 pages, Mar. 1997.
"Cryptography Functions," http://msdn.microsoft.com/library/en-us/security/security/cryptography_functions.asp?frame=true, pp. 1-16, Oct. 2002.
"CRYPTO'89," http://theory.lcs.mit.edu/~dmjones/hbp/crypto/crypto89.html, 6 pages, 1989.
Y. Sella, "Technical Reports of the Leibniz Center," http://leibniz.cs.huji.ac.il/research/abstract.php?abstract=375, 1 page, Jan. 2002.
"Research," http://www.cyber.ee/research/, 3 pages, Oct. 2002.
T. Leighton et al., "Provably Fast and Secure Digital Signature Algorithms Based on Secure Hash Functions," Massachusetts Institute of Technology, Cambridge, Massachusetts, pp. 1-68, Sep. 1993.
S. Vaudenay, "One-Time Identification with Low Memory," Proceedings of EUROCODE'92, Udine, Italy, CISM Courses and Lectures, No. 339, pp. 217-228, 1993.

* cited by examiner

METHODS AND APPARATUS FOR EFFICIENT COMPUTATION OF ONE-WAY CHAINS IN CRYPTOGRAPHIC APPLICATIONS

CROSS-REFERENCE TO RELATED APPLICATION(S)

This application is a continuation of U.S. application Ser. No. 13/302,238 filed on Nov. 22, 2011, which is a continuation of U.S. application Ser. No. 12/131,404 filed on Jun. 2, 2008 and now issued as U.S. Pat. No. 8,086,866, which is a continuation of U.S. application Ser. No. 09/969,833 filed on Oct. 3, 2001 and now issued as U.S. Pat. No. 7,404,080, the disclosure of which is incorporated herein by reference. U.S. application Ser. No. 09/969,833 claims the priority of U.S. Provisional Application Ser. No. 60/284,001 filed on Apr. 16, 2001, the disclosure of which is incorporated by reference herein.

FIELD OF THE INVENTION

The present invention relates generally to the field of cryptography, and more particularly to techniques for computing consecutive values of one-way chains and other types of one-way graphs in cryptographic applications such as encryption, decryption, digital signatures, message authentication, user and device authentication, micro-payments, etc.

BACKGROUND OF THE INVENTION

A one-way function is a function f for which one can compute the value $y=f(x)$ given the value x, but for which it is computationally infeasible to compute the value x given y, unless a so-called "trap door" is known, where only particular one-way functions have trap doors. In the above context, the value x is called the pre-image of y, and the value y is called the image of x, both relative to the function f. Examples of one-way functions include hash functions, such as the well-known SHA-1 and MD5 hashing algorithms, and functions for generating message authentication codes (MACs). For additional details regarding these and other one-way functions, see A. J. Menezes et al., "Handbook of Applied Cryptography," CRC Press, 1997, which is incorporated by reference herein.

For many cryptographic applications, it is desirable to compute a so-called one-way chain. This is a sequence of values $v_1 \ldots v_s$ such that $v_{i-1}=f(v_i)$. More generally, $v_{i-1}=f(g(v_i))$, where g is a function that maps input of the size of the output of a hash chain or other one-way function h to the size of the input of the function h. In particular, g could be a truncation of information to the right length, a padding of information to the right length, or other similar mapping function, as is well known to those skilled in the art. It is also known that if h is a function that accepts input of arbitrary length, as hash functions do, then there is no need to use the function g. Alternatively, one could say that g in such a situation is the identity function. In order to simplify the notation used herein, the potential use of the function g will not be shown explicitly, as this can be understood to be appropriately built into the functionality of the one-way function h, if needed.

It should also be noted that one may use different functions for different steps in the chain, where a "step" of the chain refers to generation of a given chain output value from a previous chain value. Similarly, one could allow auxiliary inputs to the various steps. For simplicity of illustration, these particular variants are not explicitly described herein, but those skilled in the art will recognize that one-way chains may be configured using these and other variants.

A one-way chain of the type described above can be computed by starting with value $v_s$ and from that value computing $v_{s-1}$ by application of the one-way function to $v_s$, then computing $v_{s-2}$ by application of the one-way function to $v_{s-1}$, and so on. This is a general case of computation of the above value $y=f(x)$, since the value y is used as input to the one-way function, in the next "link" of the chain. One important reason for using such chains is to represent time. For example, if a one-way chain $v_1 \ldots v_s$ is computed by a first party from an endpoint value $v_s$, and the value $v_1$ of the chain is given to a second party, then the first party can "increment time" by showing consecutive pre-images $v_2$, $v_3$, etc. to the second party. Note that the second party cannot compute these consecutive pre-images from $v_1$ on its own. However, given a pre-image $v_2$, the second party can verify the correctness of that pre-image by checking if $v_1=f(v_2)$. For $v_3$, this verification would have two steps, a first in which $v_2$ is computed, and a second in which $v_1$ is computed and compared to the known value $v_1$.

Another known use of one-way chains is as a representation of money or other payment mechanism in a micro-payments application. For example, if a first party generates a one-way chain and has it authenticated by a bank, e.g., via a digital signature on the endpoint $v_s$ of the chain, then the first party can pay a second party one unit of payment by revealing $v_2$. The second party can take this value to the bank to obtain funds for it. The first party can pay a second unit to the second party by revealing $v_3$, and so on. Note that this simple example is applicable to only a single payee.

One-way chains are also used in computing keys for verifying the authenticity of messages having MACs. See A. Perrig et al., "Efficient and Secure Source Authentication for Multicast," Proceedings of Network and Distributed System Security Symposium NDSS 2001, February 2001, A. Perrig et al., "Efficient Authentication and Signing of Multicast Streams over Lossy Channels," Proc. of IEEE Security and Privacy Symposium SP 2000, May 2000, and A. Perrig et al., "TESLA: Multicast Source Authentication Transform," Proposed IRTF draft, all of which are incorporated by reference herein. In this approach, a device would compute and broadcast a message and its corresponding MAC during a first time interval, and then release the key during a later time interval. Recipients could verify the MAC after the key is released, and would trust the authenticity of the message based on the knowledge that only the sender could have known the key at the time the MAC was broadcast. The key is verified by applying a hash function to that key and comparing the result to a less recent key associated with the same chain, and therefore with the sender.

The conventional use of one-way chains in these and other applications suffers from a significant drawback, in that in order to output consecutive chain values, those values must be either stored or computed. If the values are to be output directly from storage without computation, the party generally must store all of the values. Alternatively, if the values are to be computed as needed, the party must compute a given value from the endpoint $v_s$ by iterated application of the function f, assuming f is not a trap door function for which the party knows the trap door or wishes to use the trap door. In the case of storage without computation, the party needs to use storage proportional to the length s of the chain, or in other words, storage $O(s)$, where $O(\ )$ denotes "on the order of." In the case of computation as needed, the first party needs to use computation $O(s)$.

This excessive storage-computation product associated with conventional one-way chain computation is particularly problematic in so-called "lightweight" processing devices, such as mobile telephones, smart cards, personal digital assistants (PDAs), and other types of wireless or portable devices, which generally have limited storage or computational resources, often due at least in part to the use of battery power in such devices. Other examples include so-called "smart dust" or "dust computers," which refer to very small computational devices which can be used to collectively cover a large area for purposes of surveillance, e.g., seismic or military.

In these and many other cases, the storage or computational costs associated with conventional one-way chain computations make it difficult or impossible to implement standard cryptographic techniques in such devices.

A need therefore exists for improved techniques for computing consecutive pre-image values of one-way chains and other one-way graphs, such that the above-noted storage and computational costs are substantially reduced, thereby improving the efficiency of cryptographic techniques and permitting implementation of such techniques in lightweight processing devices.

SUMMARY OF THE INVENTION

The present invention meets the above-described need by providing methods and apparatus for efficient computation of consecutive values of one-way chains and other one-way graphs. In accordance with one aspect of the invention, helper values are positioned and utilized in a manner which substantially reduces a storage-computation product associated with generating chain values. More particularly, the storage-computation product is reduced using the techniques of the invention such that it is on the order of the square of the logarithm of the chain length s, i.e., $O((\log s)^2)$, rather than on the order of the chain length itself, i.e., $O(s)$, as in the conventional approaches previously described.

In an illustrative embodiment of the invention, the one-way chain is a chain of length s having positions $i=1, 2, \ldots s$ each having a corresponding value $v_i$ associated therewith, wherein the value $v_i$ is given by $v_i = h(v_{i+1})$, for a particular hash function or other one-way function h. An initial distribution of helper values may be stored for the one-way chain of length s, e.g., at positions given by $i=2^j$ for $0 \leq j \leq \log_2 s$. A given one of the output values $v_i$ at a current position in the one-way chain may be computed utilizing a first helper value previously stored for another position in the one-way chain between the current position and an endpoint of the chain. After computation of the given output value, the positions of the helper values are adjusted so as to facilitate computation of subsequent output values.

In accordance with another aspect of the invention, each of the helper values in the initial distribution of helper values within the one-way chain corresponds to a peg, the peg having associated therewith other information in addition to the helper value. This other information may include a destination position in the chain, a priority indicator, and a state. Upon computation of a given one of the output values, one or more of the pegs are relocated to new positions in the one-way chain, and for any of the relocated pegs, new helper values are computed.

The peg relocation process is preferably configured such that for each position i in the chain a corresponding output value $v_i$ can be computed and any pegs relocated within a specified computational budget. For example, the number of pegs utilized in the one-way chain in an illustrative embodiment may be given approximately by $\sigma \lceil \log_2 (\sigma+1) \rceil$, where $s=2^\sigma$ is the length of the chain, and the specified computational budget may be given approximately by a budget $b = \lfloor \sigma/2 \rfloor$. As a more particular numerical example, if $\sigma=31$, $s=2^{31}=2.147 \times 10^9$, and the budget b will be 15, indicating that each chain value will require a maximum of 15 hash function applications to compute. There are n=36 pegs required in this example, each of which can be implemented using 20 bytes to store the helper value, assuming use of the well-known SHA-1 hash function, plus an additional 8 bytes for storing state information: This results in a total required storage of only $36 \times (20+8) = 1008$ bytes. If this example one-way chain is implemented in an application which requires the output of one chain value per second, the chain would last for more than 68 years.

DETAILED DESCRIPTION OF THE INVENTION

The present invention will be illustrated herein using particular example one-way chains. It should be understood, however, that the techniques of the invention are more broadly applicable to other types of one-way chains, e.g., chains constructed using other types of one-way functions, with or without trap doors. As indicated above, one may use different functions for different steps in the chain, or may allow auxiliary inputs to one or more of the steps. In addition, the techniques of the invention may also be applied to sequences of values arranged in the form of a tree or other graph, rather than a linear sequence of chain values. Moreover, the particular illustrative embodiments shown and described are by way of example only, and can be reconfigured or otherwise modified to accommodate the specific needs of a given application.

The term "one-way function" as used herein is intended to include, by way of example and without limitation, any function for which it is substantially more efficient to compute images from pre-images, than it is to compute pre-images from images, e.g., a function for which inversion is computationally expensive, infeasible or otherwise difficult to achieve.

The term "chain" as used herein is intended to be construed generally so as to include not only linear sequences of values, but also tree or graph structures having multiple branches, each of which may itself correspond to a linear sequence of values.

The term "one-way chain" refers to a chain in which at least one pair of values are related to one another via a one-way function.

Figure 1:
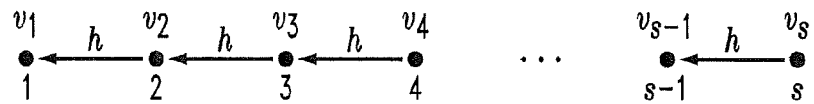
FIG. 1 illustrates an example one-way chain for which consecutive output values may be computed in an efficient manner utilizing the techniques of the invention.

FIG. 1 shows an example one-way chain for which a sequence of consecutive values may be computed in an efficient manner utilizing the techniques of the invention. The one-way chain in this example is assumed to be a one-way chain including a total of s elements, each associated with a corresponding position in the chain. The first element of the chain is the element at position 1, and is also referred to herein as the starting point of the chain. The last element of the chain, also referred to herein as the endpoint of the chain, is the element at position s, where s denotes the span or length of the chain. Associated with each of the positions i=1, 2, . . . s is a corresponding value $v_i$ as shown. The one-way chain in this example is configured such that the value $v_i$ is given by:

$$v_i = h(v_{i+1}),$$

for a given function h, where it should be understood that h may denote a hash function or another type of one-way function. A given current value $v_i$ in the one-way chain is thus computed by applying the function h to the next value in the chain, where the term "next" in this context refers to the value $v_{i+1}$. As indicated previously, computing each value in the chain starting from the endpoint value at position s is unduly computation intensive, and storing each value along the chain is unduly storage intensive. The problem is exacerbated for the above-noted "lightweight" processing devices, i.e., those devices having limited computational or memory resources.

The present invention in an illustrative embodiment provides techniques for improving the efficiency of computing a given value $v_i$ of the FIG. 1 one-way chain. In accordance with the invention, so-called helper values are positioned and utilized in a manner which substantially reduces the storage-computation product associated with generating chain values. More particularly, the storage-computation product is reduced using the techniques of the invention such that it is on the order of the square of the logarithm of the chain length, rather than on the order of the chain length itself as in the conventional approaches previously described.

By way of introducing the invention, assume initially that one wants to compute a value for an element close to the beginning of the FIG. 1 chain. If no values along the chain are stored, then the computation requires an amount of work proportional to the length s of the chain. If a helper value is introduced at some distance d from a current chain element for which the value is to be computed, the cost of computing that value is d−1 hash function evaluations. The cost for the next value to be computed, in turn, will be d−2 such evaluations. However, once the helper value is reached, the cost of the next value will be that of reaching the endpoint of the chain, assuming only one helper value is used. In this simple example, the total cost is minimized if d=s/2, i.e., the helper value is located at the midpoint of the chain.

If one uses two helper values instead of one, then the entire interval may be split into three equally long intervals, in which case the cost of computing the next element would be upper bounded by s/3 hash function evaluations. Various other linear combinations of storage and computation are also possible. For example, if one stores every 100th value of a hash chain of length s, where s>>100, one only needs storage O(s/100), and only needs computation O(100) in a worst case setting, where, as noted previously herein, O( ) denotes "on the order of." However, the storage-computation product S×C, where S denotes the amount of storage needed, and C denotes the worst case amount of computation needed per output value, is still proportional to the length s of the chain, i.e., S×C is O(s).

If the entire interval is split into two equally long intervals, and then the first of these two is itself split into two, the initial computation cost is upper bounded at s/4 hash function evaluations. This lower initial cost applies for the first half of the entire interval, after which the distance to the next element, i.e., the endpoint, would be s/2. However, if upon reaching the first helper value one relocates that helper value to a new midpoint between the initial or global midpoint and the endpoint, an upper bound of s/4 can be maintained, assuming there are sufficient remaining computational resources to perform the relocation operation. Note now that if there are three helper values, there are more values to relocate, but the computational upper bound is reduced for each element since the intervals decrease in length with an increasing number. Using approximately log s helper values will maximize the benefits of the helper values, since in this case for every element for which a value is to be computed, there will be a helper value at a maximum distance of two positions away.

Figure 2A:
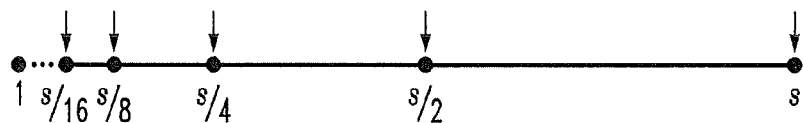
FIG. 2A shows an example of an initial setup of stored helper values in an illustrative embodiment of the invention.

FIG. 2A illustrates an initial distribution of the above-described helper values in accordance with the invention. These helper values are also generally referred to herein as "pegs," although a given peg may include not only the particular helper value, but also certain additional information, as will be described in more detail below. Each peg may therefore be viewed as having a single helper value associated therewith, the helper value being the value $v_i$ of the chain at the peg position. In the FIG. 2A diagram, which shows an initial distribution of helper values for the FIG. 1 hash chain of length s, helper values or pegs are determined for positions s, s/2, s/4, s/8, etc. More generally, the pegs are initially placed at positions $$i = 2^j \text{ for } 0 \leq j \leq \log_2 s.$$

In addition to these pegs starting at positions $2^j$, it is generally desirable to include a small number of additional pegs in order to be able to start moving pegs immediately during the computation process, before any particular peg is "reached" in the process and thus available for relocation. The total number of required pegs is O(log s).

It is to be appreciated that the particular initial peg placement illustrated and described in conjunction with FIG. 2A is by way of example only. It is possible for one to place the pegs at other initial locations similar to those in the example given above, e.g., to place the pegs at initial positions $i=2^j+1$, or to otherwise initially place the pegs so as to provide a different tradeoff between storage and computation. For example, instead of dividing intervals into two equally long portions as in the above example, one could divide each interval into three equal portions, and then further divide one of the three into three pieces, and so on, which would result in additional storage cost but reduced computation cost. Other types of interval splitting can also be used when implementing the present invention.

In operation, the chain values $v_i$ for the FIG. 1 one-way chain are typically computed and output one at a time, with a single value being computed and output for each time interval i. The pegs described in conjunction with FIG. 2A facilitate this computation. More particularly, for each time interval i, the value $v_i$ for that interval is output, and one or more of the pegs are relocated so as to facilitate subsequent computations. The peg relocation process ensures that for each interval i the required output value $v_i$ and the appropriate relocation can be determined within a certain budget which is also O(log s).

Figure 2B:
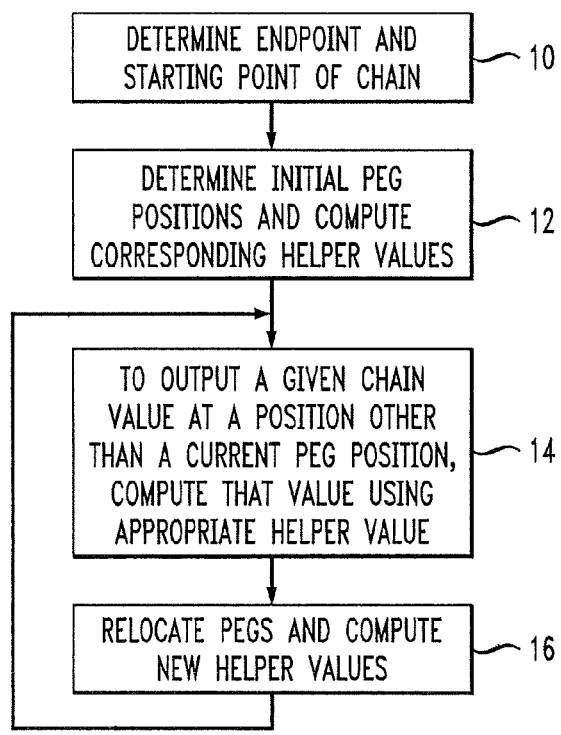
FIG. 2B is a flow diagram of an example one-way chain computation process in accordance with the invention.

FIG. 2B shows a flow diagram of a hash chain computation process in accordance with the invention. In step 10, the endpoint and starting point of the chain are determined. This step may be implemented by selecting an endpoint value at random, and computing the starting point value by repeated application of the appropriate hash function until the desired length is reached. In step 12, initial peg positions are determined and corresponding helper values are computed. Then, in step 14, the process outputs a given chain value at a position other than a current position of one of the pegs by computing that value using the appropriate helper value, i.e., that helper value closest to the position of the given chain value in the direction of the chain endpoint. After the given chain value is output, step 16 indicates that the pegs are relocated, and new helper values are computed. More detailed examples of the FIG. 2B process will be described below.

Relocation of a given peg requires computing its corresponding helper value $v_i$ at the new location. The cost for computing the helper value at the new location is proportional to the distance that the associated peg is moved. Thus, if a new peg is placed on top of an existing peg at a position i, and then moved to a position i–j, the cost is proportional to the distance j. Similarly, if a peg is located at position i (whether there is another peg at this position or not), the cost of moving it to position i–j is also proportional to the distance j. The distance j in both of these cases corresponds to the number of one-way function evaluations required to compute the value at position i–j from the value at position i.

However, the cost metric to be minimized in the illustrative embodiment is not computation alone, but the previously-described storage-computation product S×C, where S denotes the amount of storage needed, and C denotes the worst case amount of computation needed per output value. This is because the helper value at the new location is obtained by iterated hash function evaluation of the next known value from the new location, just as the value to be output from that location would be computed. While one could clearly lower the cost of relocating helper values by increasing the number of such values, thereby decreasing the distance between them, the results described herein will generally be evaluated in terms of the above-noted storage-computation product.

A budget is preferably assigned for each value $v_i$ to be computed and output. The budget corresponds to the computational upper bound per element. The computation of the current chain element has the highest priority to access this budget, since for each position in the hash chain, one has to compute and output the appropriate value $v_i$. Any remaining budget is assigned to the computation of helper values.

These helper values may be advantageously partitioned into high priority helper values and low priority helper values. In the illustrative embodiment, high priority helper values are generally relocated into already relatively small intervals, located close to the current element, while low priority helper values, in contrast, generally traverse larger distances, and are further from the current element. The low priority helper values are only assigned those portions of the above-noted budget that remain after the current element has been computed, and the high priority helper values have exhausted their needs, i.e., arrived at their respective destinations.

It is also possible to have more than two priority levels. The illustrative embodiments described herein utilize two priority levels, but further prioritize elements within a given level based on their distance to the current position, with decreasing priority with an increasing distance. Here, the current position corresponds to the position in the chain for which a value has just been output, or will just be output.

As indicated previously in conjunction with FIG. 2B, during an initialization or setup phase of the chain computation process, the value $v_s$ at the endpoint of the chain may be randomly selected, and the desired start point obtained by iterated hash function evaluation. This function may be performed by a device with fewer computational limitations than the device that later will compute and output the consecutive values $v_i$ for the hash chain elements. Alternatively, the same device may be used for both initialization of the hash chain and generation of the outputs $v_i$. The initialization also preferably includes the above-noted initial placement of pegs, as illustrated in FIG. 2A. Thus, each peg will have a position and a helper value associated therewith, where the value is obtained for a given peg position by iterated hash function application of the endpoint value $v_s$ or a helper value in the direction of the endpoint.

An example processing device and corresponding system implementation will now be described with reference to FIGS. 3 and 4, respectively, followed by a more detailed description of the particular one-way chain computation protocols of the illustrative embodiments.

Figure 3:
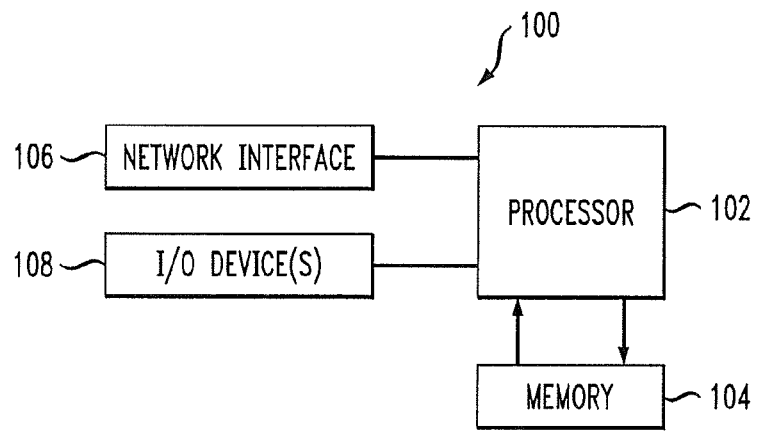
FIG. 3 shows a simplified block diagram of an illustrative processing device in which the present invention may be wholly or partially implemented.

FIG. 3 shows an example processing device 100 that may be used to implement at least a portion of a one-way chain computation process in accordance with the invention. The processing device 100 in this example includes a processor 102, a memory 104, a network interface 106 and one or more input/output (I/O) devices 108. The device 100 may represent a lightweight processing device such as a mobile telephone, smart card, personal digital assistants (PDAs), dust computer, video camera, surveillance device, motion detector, heat detector, or other type of wireless or portable device, or a portion or combination of these or other devices. The processor 102 executes one or more software programs stored in memory 104 in order to implement at least a portion of a one-way chain computation protocol in accordance with the invention. For example, the processor 102 may be configured to receive a starting point and endpoint of a given chain from one or more other sources, and to compute consecutive chain values $v_i$ in the manner described herein. The processor 102 may also be configured to randomly select the endpoint value $v_s$ and compute the starting point therefrom, as indicated previously. As would be understood by one skilled in the art, memory 104 is an example of what is more generally referred to herein as a machine-readable medium.

Figure 4:
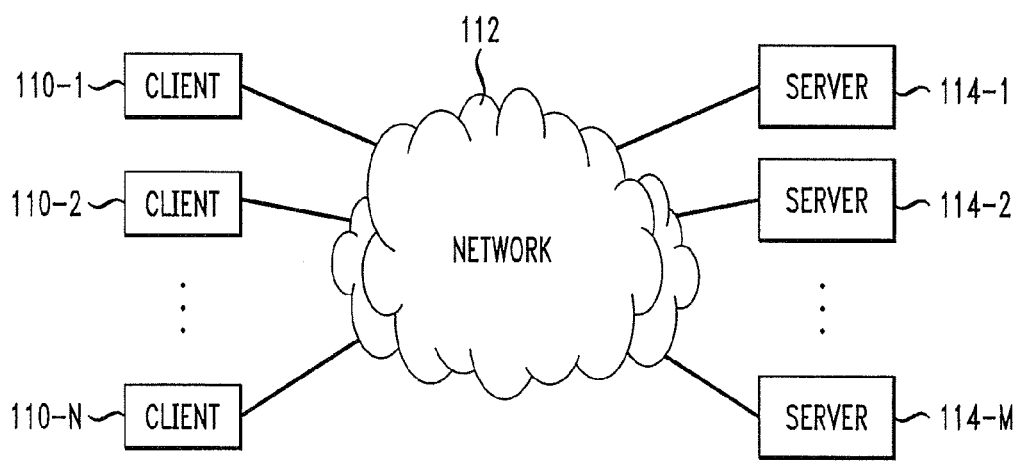
FIG. 4 shows an example network-based embodiment of the present invention.

FIG. 4 shows an example system configuration which incorporates a number of client devices 110-1, 110-2, . . . 110-N each being connectable via a network 112 to one or more server devices 114-1, 114-2, . . . 114-M. One or more of the clients 110 or the servers 114 may be implemented as device 100 of FIG. 3 or using a similar arrangement of elements. In this type of system configuration, one-way chain values may be generated by one or more of the clients 110 and sent to one or more of the servers, or vice versa. Other types of communication between the various elements of FIG. 4 are also possible using the techniques of the invention, as will be apparent to those skilled in the art.

It should be emphasized that the particular arrangements of elements shown in FIGS. 3 and 4 are by way of example only, and should not be construed as limiting the scope of the invention in any way. The invention can be implemented in whole or in part using any type of processing device(s) having a processor and associated memory, regardless of the particular implementation of these elements within the device(s).

A first illustrative embodiment of a one-way chain computation protocol in accordance with the invention will now be described. This example protocol is correct, meaning that it can be shown that the correct value will be output, regardless of the length of the chain or the particular values on the chain. It is also complete, which means that the computation can be performed without exceeding the specified computational limitations.

In this embodiment, a hash chain H is given by a sequence of values $\{v_1, \ldots, v_i, \ldots v_s\}$, such as that previously described in conjunction with FIG. 1, where $v_s$ is a value chosen uniformly at random from $\{0,1\}^k$, and $v_i = h(v_{i+1})$, where $h: \{0, 1\}^* \to \{0,1\}^k$ is a hash function, such as the above-noted SHA-1 or MD5 hash function, or another type of one-way function or other function for which it is substantially more efficient to compute images from pre-images than it is to compute pre-images from images. The function h is assumed in this embodiment to be publicly computable, i.e., computable with access to public information only, although it is also possible to used keyed functions, in which case a portion of the input is generally not public. The value $v_1$ is the starting point of the chain, the value $v_s$ is the endpoint of the chain, and the span s denotes the length of the chain, e.g., the number of consecutive elements to be generated. It is assumed for this embodiment that $s=2^\sigma$ for an integer $\sigma>2$. If other chain lengths are desired, s may be selected as the smallest value of the above form that is greater than the desired length.

The budget b is defined as the number of computational units allowed per element of the hash chain that is output. Here, only hash function evaluations are counted and not other computational steps associated with the protocol execution. This is reasonable given the fact that the computational effort of performing one hash function evaluation far exceeds the remaining work per element.

Each helper value, and the chain endpoint, is associated with a peg $p_j$. Each peg $p_j$ has a position in the chain and a value associated with it. If position is the position of a peg, then its value is $v_{position}$. Additionally, each peg is associated with a destination (the position to which it is going), a priority (high or low), and an activity status or state (free, ready, active, arrived).

The variable n will be used in this embodiment to denote the number of pegs used. The amount of storage needed is n times the amount needed per peg, plus the amount needed for the execution of the protocol.

After performing a setup phase of the type described previously, the computation protocol in this embodiment will generate the sequence of values comprising the hash chain H, element by element, starting from $v_1$, using a minimal budget and a minimal number of pegs. The protocol has a required budget $b=\lfloor a/2 \rfloor$ and uses $n=\sigma+\lceil \log_2(\sigma+1) \rceil$ pegs, where, as indicated above, $s=2^\sigma$ is the number of elements of the hash chain H. If a peg is located at the position corresponding to the current output, it is said that this peg has been "reached," at which time it enters the free state. All pegs in the free state are assigned a new position, destination, state and priority, according to guidelines that are set up to guarantee protocol completeness. These guidelines are described below.

At each step, the appropriate hash chain value, i.e., the current hash chain value, is computed and output. Then, any remaining budget is assigned to active high-priority pegs, starting with the peg with the lowest position value, i.e., the peg closest to the starting point. Any still remaining budget is assigned to active low-priority pegs. This is to ensure that computational results will be available when needed.

If several pegs have the same priority level, the peg with the smallest distance to the current position is selected. One could assign different priorities based on distance in this manner, but for simplicity two levels are used, with prioritization within a given level based on distance to the current position.

High-priority pegs are started at the "far end" of the first interval after the current value, only counting intervals that are larger than two. High-priority pegs are only allowed to be in the active state in positions lower than the active low-priority peg, and are otherwise kept in the free state. This is to make sure that high-priority pegs do not take too much of the available budget, i.e., it slows high-priority pegs down to the benefit of low-priority pegs when the former complete their imminent tasks.

Low-priority pegs are started at a position such that they cannot complete, i.e., arrive at their destinations, before the next peg is reached. Thus, only one active low-priority peg is needed at a time, since one will suffice to absorb any leftover computational units. In addition to the active low-priority peg, there is preferably one "backup" low-priority peg (in the ready state). This backup low-priority peg is activated as soon as the previously active peg has arrived at its destination. When a peg is reached, its priority is set to low if there is currently no backup low-priority peg; otherwise, it is made a high-priority peg. These rules guarantee that there always is a low-priority peg to consume leftover computational units, even right after an active peg has reached its destination.

The initialization phase in this illustrative embodiment is as follows. As indicated above, the endpoint $v_s$ is chosen uniformly at random from $\{0,1\}^k$, where k is assumed in this embodiment to be set to 160, although other values could also be used. The sequence $H=\{v_1, \ldots, v_i, \ldots, v_s\}$ is computed by iterated application of the hash function h, where $v_i=h(v_{i+1})$, $1 \leq i < s$.

Peg $p_j$, $1 \leq j \leq \sigma$, for $\sigma=\log_2 s$, is initialized as follows:

$$\begin{cases} \text{position} \leftarrow 2^j \\ \text{destination} \leftarrow 2^j \\ \text{value} \leftarrow v_{2^j} \\ \text{status} \leftarrow \text{arrived.} \end{cases}$$

The remaining pegs, $p_j$, $\sigma < j \leq n$, have their status set to free. All the peg information is stored on the device that is to generate the desired output sequence. This device also stores a pair of counters, current $\leftarrow 0$ and backup $\leftarrow 0$, along with the span or length s. At the conclusion of the initialization phase, a pair (startpoint, current)=$(v_1, 0)$ may be output.

In the following, it is assumed that the pegs $p_j$, $1 \leq j \leq n$, are kept sorted with respect to their destination, with the lowest destination value first, and that pegs that do not have a destination assigned appear last in the sorted list. Consequently, the next peg to be reached (from the current position) will always be $p_1$. When the status of the pegs is changed at any point, the altered item is inserted at the appropriate place in this sorted list. The notation LP (short for low priority) is used as an alias of the active low-priority peg. Thus, LP·position is the current position of the active low-priority peg, independently of what peg number this corresponds to. Similarly, BU refers to the backup low-priority peg, and BU·position is the current position of the backup low-priority peg.

The following protocol is performed in order to compute the hash chain in the manner indicated above. Each iteration of the protocol causes the next hash chain value to be generated and output. The protocol makes use of two routines, placeHP and placeLP. These routines assign values to high priority and low priority pegs, respectively, and are also described below.

| | | |
|---|---|---|
| 1. | Set available b. | (Set the remaining budget) |
| 2. | Increase current by 1. | (Current is position of output value) |
| 3. | If current is odd then output h($p_1$.value), | (No peg at this position) (Compute and output) |

```
            decrease available by 1,
        else                                    (A peg at this position)
            output p_1.value,                   (Output value, set peg state to free)
            set p_1.status ← free,
            if current = s, then halt           (Last value in sequence)
4.      For all free pegs p_j do                (Reassign free pegs)
            if backup = 0 then                  (Backup low-priority needed)
                p_j.priority ← low,
                p_j.status ← ready,
                BU ← p_j,
                backup ← 1,
            else
                call placeHP (p_j).             (Make it high priority)
5.      Sort pegs.
6.      Set j ← 1.                              (First peg first)
7.      While available > 0 do
            decrease available by 1,            (Decrease remaining budget by one)
            decrease p_j.position by 1,         (Move peg)
            p_j.value ← h(p_j.value),           (and compute its value)
            if p_j.position = p_j.destination then  (Peg arrived)
                p_j.status ← arrived,
                if p_j.priority = low then      (A low-priority peg arrived)
                    LP ← BU,                    (Backup becomes low priority)
                    backup ← 0,
                    call placeLP,               (Activate new low priority peg)
                    sort pegs,
                    increase j by 1.            (Next peg)
8.      Sort pegs.
9.      Go to 1.                                (Next element now)
```

The routine placeLP will now be described. Initially, it will be described how one could compute the sequence of values assigned to variables during calls to placeLP. It will later be described how just one such assignment can be computed, as opposed to an entire sequence. An approach which minimizes usage of stack space will also be described. The desired functionality of the placeLP routine is to compute the next starting point for a low-priority peg, along with the associated destination.

In the following, "normalized" positions are used for ease of illustration and to provide uniformity over different chain lengths. To obtain an actual position from a normalized position, one multiplies the latter by a value $\lambda$, where $\lambda$ is the smallest power of two not smaller than $2b$, and where $b$ is the budget. Thus, the series of normalized starting points, starting with (4, 8, 6, 8, 16, 12, 10, 12, 16, 14, 16), corresponds to a series (32, 64, 48, 64, 128, 96, 80, 96, 128, 112, 128) for $b=4$, $\lambda=8$. Similarly, the destination points and the distances between the starting points for the pegs and their destinations are described in normalized terms.

Over time, pegs are placed at appropriate positions in the chain, each such position being in an interval whose endpoints correspond to other pegs and/or the current position. In the above illustrative embodiment, a given peg splits an interval into two equally large intervals. The resulting portions are then split again, always splitting the largest portion, and breaking ties between equally large intervals by selecting that which is located closest to the starting point of the chain, i.e., closest to the current position, but between this position and the endpoint of the chain.

The first split of an interval may be viewed as being associated with the root of a tree. The children of the root correspond to the splits of the resulting two intervals, and their children by their respective splits. The leaves correspond to the smallest splits of the intervals. With each node of the tree, there is associated a starting point, a distance and a destination, where the destination is the difference between the starting point and the distance.

The starting point for the root of a tree of height $j$ is $start=2^{j+1}$. The distance of a node at height $i$ in the tree is $dist=2^{i-1}$. Thus, the distance of the root is $2^{j-1}$, and leaves of the tree all have normalized distance $dist=1$. The destination dest of any node (and the root in particular) is the difference between its starting point and distance, i.e., $dest=start-dist$. Finally, the starting point for a left child is its parent's destination value, parent·dest, while it is the parent's starting value parent·start for a right child.

Consider the sequence of assignments of start and dest that one obtains from performing a depth-first search (with the left child always traversed before the right child). That is the sequence of assignments corresponding to the associated initial interval, i.e., the interval before splitting. Consider further the sequence of such assignments one gets from traversing a "forest" of such trees, where the first tree has height one, and each tree is one level higher than its predecessor. That is the needed sequence of normalized assignments.

Each call to placeLP first computes such a pair of normalized values, all from the above described sequence, then multiplies these by 2 and returns the result. Thus, it sets $$\begin{cases} LP.\text{priority} \leftarrow \text{low} \\ LP.\text{status} \leftarrow \text{active} \\ LP.\text{position} \leftarrow \lambda start \\ LP.\text{destination} \leftarrow \lambda dest \end{cases}$$

As soon as $\lambda\, start > s$, no assignment is performed, since there is no longer any need for low priority pegs. Any calls to placeLP after that return without any assignment.

The routine placeLP generates a sequence of elements, where the ith element of the sequence corresponds to the pair of starting position and destination on the hash chain H, of the ith low-priority peg to be activated. The starting point corresponds to that of a peg already placed on the hash chain, and the destination corresponds to the middle point between this same peg and the closest peg in the direction of the current pointer. The distance between starting point and destination is at least twice the budget per element that is available for moving pegs, which guarantees that the low priority peg does not reach its destination before another peg has been activated.

The routine for computing the next location for a high-priority peg is similar to the above, its main differences being that (1) the real and normalized values coincide, and (2) after the trees in the forest have reached height $\log_2 \lambda$, they stop growing.

Thus, the starting position of the ith tree is start=$2^{i+1}$ for $i \leq \log_2 \lambda$, and start=$\lambda$ ($i - \log_2 \lambda$) for $i > \log_2 \lambda$. As before, the starting point for a left child is its parent's destination value, parent·dest, while it is the parent's starting value parent·start for a right child. The distance of a node at height i in the tree is dist=$2^{i-1}$. The destination, as before, is the difference between its starting point and distance, i.e., dest=start−dist.

Before any assignment is made, it is verified that start≤LP·position, i.e., that the assignment in question is to a position before the active low-priority peg. If this is not the case, no assignment is made at this point, and the comparison is re-performed at the next call to the routine. Otherwise, the following assignment is made to peg $p_j$ in the routine:

$$\begin{cases} p_j.\text{priority} \leftarrow \text{high} \\ p_j.\text{status} \leftarrow \text{active} \\ p_j.\text{position} \leftarrow \text{start} \\ p_j.\text{destination} \leftarrow \text{dest} \end{cases}$$

The routine placeHP will now be described. This routine generates a sequence of elements, where the ith element of the sequence corresponds to the pair (start, dest) of the ith high-priority peg to be activated. The starting point start corresponds to that of a peg already placed on the hash chain, and the destination dest corresponds to the middle point between this same peg and the closest peg in the direction of the current pointer. The starting point is chosen as a point between the current pointer and the active low-priority peg, as close to the current pointer as possible, such that the distance between the starting point and the destination is at least two.

A number of issues relating to the storage complexity of the above-described placeLP and placeHP routines will now be addressed. A memory stack may be used to facilitate the above-described processing, as will be readily appreciated by those skilled in the art. Alternatively, in order to conserve working space, one can opt for a solution that does not use a stack, but which recomputes the state from scratch when needed. One variable would store the height of the tree, and another would store the number of steps (using depth-first search) from the root. Additionally, variables are needed for start, dist and dest. To compute these values, one would (at each time) begin with their starting assignments, and then modify them according to the tree traversals leading to the wanted number of steps from the root. This is done in accordance with the respective assignments, as above. It should be noted that none of these operations require any hash function evaluation.

The maximum tree height for placeLP is $\sigma - \log_2 \lambda - 1$, since this corresponds to a normalized starting point of $2^{\sigma-\lambda}$ and a starting point of $2^\sigma$. Thus, this variable needs $\lfloor \log_2 \sigma \rfloor$ bits. For placeHP, the maximum height is $\log_2 \lambda$, requiring $\lceil \log_2 \lceil \log_2 \lambda \rceil \rceil$ bits of storage. A tree of the maximum height has $2^{\sigma-\log_2 \lambda}-1$ nodes for placeLP, and $2^\lambda - 1$ nodes for placeHP. Thus, the distances from the root can be represented with $\sigma - \log_2 \lambda - 1$ respective 2 bits. Finally, the maximum value of the last three variables is $\sigma$ bits for each one of them, since the maximum value they can be assigned is $2^\sigma$. These only keep state within a computation, and so it is not necessary to have one set for each routine.

Therefore, the storage requirements of placeLP and placeHP are less than $4\sigma + \log_2 \sigma + \lambda - 1$ bits. This is dwarfed by the storage requirements for the pegs, which require 160 bits to store the value, and some low number of bits (depending on the length of the chain) for the remaining state information, e.g., counters, etc. In particular, a bits are needed for each of the position and the destination. In this embodiment, a total of about $(160+2\sigma)(\sigma + \lceil \log_2 \lceil \log_2 (\sigma+1) \rceil \rceil)$ bits are required.

Consider a one-way chain of length s=$2^\sigma$, a budget b=$\lfloor \sigma/2 \rfloor$ and n pegs, for n=$\sigma + \lceil \log_2 (\sigma+1) \rceil$. The sum of the budgets from the setup stage until a particular element is referred to as the cumulative budget at the element in question.

As a more particular numerical example, if $\sigma=31$, s=$2^{31}$=2.147×$10^9$, and the budget b will be 15, indicating that each chain value will require a maximum of 15 hash function applications to compute. There are n=36 pegs required in this example, each of which can be implemented using 20 bytes to store the helper value, assuming use of the well-known SHA-1 hash function, described in FIPS PUB 180-1, "Secure Hash Standard, SHA-1," www.itl.nist.gov/fipspubs/fip180-1.htm, which is incorporated by reference herein, plus an additional 8 bytes for storing state information. This results in a total required storage of 36×(20+8)=1008 bytes. If this one-way chain is implemented in an application which requires the output of one chain value per second, the chain would last for more than 68 years.

As indicated above, the one-way chain computation protocol in this illustrative embodiment exhibits the property of completeness. The protocol with a budget restriction of b and a storage restriction of n may be said to succeed at element j if and only if it outputs the jth value $v_j$ of the hash sequence, and if it succeeded at element j−1. The protocol is said to succeed automatically at element 1, which corresponds to the setup phase, on which in the illustrative embodiment there are no strict restrictions placed in terms of computation and storage.

It can be shown that the protocol succeeds at element j, $2 \leq j \leq s$, for a chain span or length s=$2^\sigma$, budget b=$\lfloor \sigma/2 \rfloor$ and n=$\sigma + \lceil \log_2 (\sigma+1) \rceil$ pegs.

The above-described protocol is a presently preferred embodiment of the present invention. An example of one possible variant of the protocol is described below. Those skilled in the art will recognize that numerous other variants are also possible.

A. Initiation

1. Select $v_s$ and set temp←$v_s$.
2. Compute v1 ... $v_{s-1}$ from $v_s$ in the manner previously described.
3. Set counters k←s, m←n.
4. Let $j_m$←k, FIX($j_m$)←$v_k$.
5. Set k←trunc(k/2) (i.e., divide in two, round down), and m←m−1.
6. Repeat k times: temp←h(temp).
7. If k>1 then go to 4.
8. Set current←1.

The above initiation process positions pegs at the locations s, s/2, s/4, . . . 2, and therefore corresponds generally to the FIG. 2A initial peg setup described in conjunction with the preferred embodiment. As indicated previously, the pegs are computed and stored for a given device, and the computations may but need not be performed by an auxiliary device. Once the given device is initialized in the manner described above, the one-way chain computation process in operation is as follows.

B. Operation

1. Increase current by one. Set available←b.

2. If, for any $p_j$·current=$p_j$·position then output $p_j$·value. Then relocate this value $p_j$ according to the placeHP or placeLP routine, depending on which one is needed.

3. Otherwise, set temp=$p_j$ for the $p_j$ with smallest $p_j$·position (in the preferred embodiment, this is always $p_1$ due to the sorting). Then, repeat the following until temp·position=current:
   decrease available by one,
   decrease temp·position by one,
   set temp·value=h(temp·value).

4. Select the next peg to be moved. In the preferred embodiment, there are already two priorities. Here, the priority is given to (1) the closest value if it is not where it needs to be next time (i.e., the difference between $p_j$·destination and $p_j$·position>b), and otherwise (2) the value with the largest position. It should be noted that although this is not an optimal strategy for assigning priority, it is acceptable for many chains.

5. Move the selected peg $p_j$ as follows:
   decrease $p_j$·position by one,
   $p_j$·value←h($p_j$·position).

6. If $p_j$·position=$p_j$·destination then $p_j$·status arrived.

7. Decrement available by one, and then if available>1, go to 4.

The above computation process corresponds to steps 1-8 of the computation process in the preferred embodiment, and is repeated for each chain output value to be generated. As indicated above, numerous other variants of the illustrative protocols can be used to implement the techniques of the present invention.

The above-described illustrative one-way chain computation protocols provide significant advantages over conventional techniques. More particularly, the above protocols have a storage-computation product that is on the order of the square of the logarithm of the chain length, i.e., is $O((\log s)^2)$, rather than $O(s)$ as it would be using the conventional techniques. The one-way chain computation of the present invention is suitable for use in numerous cryptographic applications, such as digital signatures, message authentication, user and device authentication, and micro-payments, and its storage and computational efficiency allows these and other cryptographic applications to be implemented on lightweight devices.

By way of example, the invention can be used to generate publicly verifiable signatures in a particularly efficient manner, using otherwise conventional techniques based on one-way chain computation. The resulting signatures are generated far more efficiently than conventional Merkle and Lamport signatures, which are generally considered among the most efficient of conventional signatures, and are described in L. Lamport, "Constructing Digital Signatures from a One Way Function," SRI International Technical Report CSL-98 (October 1979), and R. Merkle, "A digital signature based on a conventional encryption function," Proceedings of Crypto '87, respectively, both of which are incorporated by reference herein.

More particularly, a digital signature application of the invention can make use of techniques similar to those described in the previously-cited A. Perrig et al. references. In this case, a receiving party time-stamps a message authentication code (MAC) once it is received from another party, using conventional time-stamping techniques, and then verifies the MAC once the corresponding key is received, where the key is a value computed on a hash chain. Then, given the key and the time-stamp, along with the message and the MAC, a third party can verify the correctness of the MAC and the fact that it was received prior to the time when the key was released. This would constitute a binding digital signature.

The present invention can also be used in secure login applications, e.g., applications in which it does not matter if a password is compromised during or after a login session, since the password is used only once. In particular, one can use the consecutive values in the hash chain as passwords, starting with $v_1$.

With reference to the FIG. 4 system, such a secure login process may be implemented as follows. Assume client 110-1 wants to login to the set of servers 114 using passwords that are sent either encrypted or unencrypted over the network 112. The client 110-1 wants to prevent an attacker from reusing a given transmitted password. Therefore, the passwords are generated as values on a hash chain, in the manner described herein, such that chain value $v_1$ is sent as the first password, $v_2$ as the second password, etc. Another party, which may be another client 110 or a particular one of the servers 114, registers the client 110-1 with the servers 114, and then transmits to the client 110-1 the endpoint value $v_s$ of the hash chain plus any additional registration information, prior to the first login attempt by the client 110-1. For a given login attempt, the client 110-1 sends to the servers 114 identifying information, registration information, the appropriate chain value $v_1$, $v_2$, etc., and a counter identifying how many login attempts have been performed or otherwise specifying which chain value has been transmitted. In a case in which the login attempts are inherently time based, the counter may be implicit. For additional details regarding this particular application, see L. Lamport, "Password authentication with insecure communication," Communications of the ACM, 24(11): 770-772, November 1981, which is incorporated by reference herein.

The invention is generally useful in any application which utilizes one-way chain computation Inasmuch as the invention substantially improves the storage and computational efficiency of the one-way chain computation process, it improves the efficiency of any application that requires one-way chain computation. The invention can be implemented in any type of processing device capable of computing one or more one-way chain values.

As indicated previously, the invention can be applied to an arrangement of elements in the form of a tree or other type of graph. Such arrangements fall within the general definition of "chain" given above. Two examples will now be provided illustrating the application of the techniques of the invention to tree or graph structures. Note that it is merely a matter of modifying the update strategy to suit the application and the particular tree or graph topology, and that the principles otherwise remain the same as those previously described.

Example 1

Tree Structure

In such a structure, the endpoint value $v_s$ corresponds to the root node of the tree. For simplicity of notation, this node will be referred to as R. Let V1 and V2 be the two children of R, and V11 and V12 be the two children of V1. Similarly, one can name all the nodes in the tree. It will be clear to one skilled in the art that the invention relates not only to binary trees, as above, but to trees with any fan-out of the vertices. Let s be the height of the tree. The value associated with the root is R·val, and may be randomly chosen, and let Vx·val be the value associated with the node Vx, where x denotes a particular path, such as "1112." Then, the value of the first child of Vx is Vx1·val=h(Vx·val,1), and the value of the second child of Vx is Vx2·val=h(Vx·val,2). Other assignments may be chosen as well, as will be appreciated by one skilled in the art. From this, it can be seen that given the value associated with a node Vx1 or Vx2, it is infeasible to determine the value associated with its parent, Vx, without knowledge of a value associated with one of its ancestors. Now, let some portion of the leaves of the tree be known, and let pegs be located at some vertices of the tree. For example, assume that one peg is located at position V1. This allows a sped-up computation of all of the nodes to whom V1 is an ancestor. In order to compute a node value in the other half of the tree, one would have to go up to R. Instead, the peg may be located on the "all-one" path, halfway from the root to the leaves. This allows the sped-up computation of a smaller portion of the tree, but with a greater speed-up. A second peg may be located on another portion of the tree. For example, a second peg may be located on the half-distance between the first peg and the leaves, on the "all-one" path. This would further speed up the computation of nodes below this second peg, and would allow other, nodes, on the path below the first but not the second peg to be computed somewhat faster. Still other nodes could still be computed, but requiring the path all the way from the root to be followed. Now, once a node has been computed, the pegs may be relocated in accordance with the probability distribution of the next access. Thus, if an access in one part of the tree makes an access in a second part of the tree more likely, one or more pegs may be relocated to this part. This will be done, as for the illustrative embodiments previously described, by spending any available budget, according to a specified prioritization, and computing new values as the consecutive one-way images of ancestor values.

Example 2

Two Linked Chains

Consider a situation in which there are two linked chains, each having its own endpoint, and where some fraction of the chain values are functions not only of the values of their corresponding chain, but also of values of the other chain. Note that the different chains may use different one-way functions, and may operate on different portions of the input. This situation therefore describes a particular form of a directed acyclic graph (DAG), and it will be appreciated by those skilled in the art that other such examples can be constructed. In a simple case, one can let every element at distance i from the endpoint of its chain be a function of both its predecessor (element i−1 of that chain) and of the other element at that distance from the endpoint of the other chain (element i−1 of the other chain). Let the lengths of each of the chains be s, and assume that pegs have been placed at distances s/2, s/4, s/8, etc., from the starting point of one of the chains, with no pegs placed on the other chain. By allowing the efficient computation of all values of one chain, one can also compute all values of the other chain, since these are interlinked. As will be appreciated by one skilled in the art, any number of chains can be interlinked in this manner, and could utilize the techniques of the invention to allow efficient computation of output values.

It should again be emphasized that the exemplary one-way chain computation techniques described herein are intended to illustrate the operation of the invention, and therefore should not be construed as limiting the invention to any particular embodiment or group of embodiments. For example, although illustrated using particular types of one-way chains, the invention can be applied to other types of one-way functions, and to arrangements of elements in other forms, such as trees or other types of graphs, as was indicated previously. In addition, the particular number of helper values used, their initial distribution, and the manner in which the corresponding pegs are relocated upon computation and output of a given chain value can be varied in alternative embodiments. These and numerous other alternative embodiments within the scope of the following claims will be apparent to those skilled in the art.

What is claimed is:

1. A method comprising:
   storing a first subset of values of a one-way chain in a memory, the first subset of values being a first distribution of values of the one-way chain determined based at least in part on a length of the one-way chain;
   utilizing at least one value of the one-way chain; and
   responsive to utilizing said at least one value, storing a second subset of remaining values of the one-way chain in the memory, the second subset of values being a second distribution different than the first distribution;
   wherein storing the first subset, utilizing said at least one value and storing the second subset are performed by at least one processing device comprising a processor coupled to a memory.

2. The method of claim 1 wherein a number of values in each of the first subset and the second subset is determined based on an amount of space available in the memory for storing the respective first and second subsets of values.

3. The method of claim 1 wherein utilizing at least one value of the one-way chain comprises generating a cryptographic output based at least in part on said at least one value.

4. The method of claim 3 wherein the cryptographic output comprises at least one of a password, a cryptographic key, a digital signature and an authentication code.

5. The method of claim 1 wherein values in each of the first subset and the second subset are distributed with substantially equal spacing from one another.

6. The method of claim 1 wherein values in each of the first subset and the second subset are distributed such that a spacing between respective ones of the values increases as distance from a current position of the one-way chain increases.

7. The method of claim 1 wherein the one-way chain is in the form of a tree structure.

8. The method of claim 1 wherein the one-way chain comprises two or more linked chains.

9. An apparatus comprising:
   a processor; and
   a memory coupled to the processor;
   the processor being configured:
      to store a first subset of values of a one-way chain in the memory, the first subset of values being a first distribution of values of the one-way chain determined based at least in part on a length of the one-way chain;
      to utilize at least one value of the one-way chain; and
      responsive to utilizing said at least one value, to store a second subset of remaining values of the one-way chain in the memory, the second subset of values being a second distribution different than the first distribution.

10. A mobile telephone comprising the apparatus of claim 9.

11. A smart card comprising the apparatus of claim 9

12. A wireless sensor comprising the apparatus of claim 9.

13. The apparatus of claim 9 wherein a number of values in each of the first subset and the second subset is determined based on an amount of space available in the memory for storing the respective first and second subsets of values.

14. The apparatus of claim 9 wherein the processor is configured to utilize said at least one value of the one-way chain by generating a cryptographic output based at least in part on said at least one value.

15. The apparatus of claim 14 wherein the cryptographic output comprises at least one of a password, a cryptographic key, a digital signature and an authentication code.

16. The apparatus of claim 9 wherein values in each of the first subset and the second subset are distributed such that a spacing between respective ones of the values increases as distance from a current position of the one-way chain increases.

17. A non-transitory machine-readable medium for storing one or more programs for use by a processor coupled to a memory, the one or more programs when executed causing the processor:

to store a first subset of values of a one-way chain in the memory, the first subset of values being a first distribution of values of the one-way chain determined based at least in part on a length of the one-way chain;

to utilize at least one value of the one-way chain; and responsive to utilizing said at least one value, to store a second subset of remaining values of the one-way chain in the memory, the second subset of values being a second distribution different than the first distribution.

18. The machine-readable medium of claim 17 wherein the one or more programs when executed cause the processor to utilize said at least one value of the one-way chain by generating a cryptographic output based at least in part on said at least one value.

19. The machine-readable medium of claim 18 wherein the cryptographic output comprises at least one of a password, a cryptographic key, a digital signature and an authentication code.

20. The machine-readable medium of claim 17 wherein values in each of the first subset and the second subset are distributed such that a spacing between respective ones of the values increases as distance from a current position of the one-way chain increases.

* * * * *

UNITED STATES PATENT AND TRADEMARK OFFICE
CERTIFICATE OF CORRECTION

PATENT NO. : 8,990,576 B2  
APPLICATION NO. : 13/940670  
DATED : March 24, 2015  
INVENTOR(S) : B. M. Jakobsson Page 1 of 1

It is certified that error appears in the above-identified patent and that said Letters Patent is hereby corrected as shown below:

In the Specification

Column 2, line 65, after "O( )" please delete ")"

Column 4, line 1, please delete "$\sigma \lceil \cdot log_2 (\sigma + 1) \rceil$" and insert -- $\sigma + \lceil log_2 (\sigma + 1) \rceil$ --

Column 9, line 37, please delete "$b = \lfloor a/2 \rfloor$" and insert -- $b = \lfloor \sigma/2 \rfloor$ --

Column 14, line 1, after "respective" please delete "2" and insert -- $\lambda$ --

Signed and Sealed this  
Thirtieth Day of June, 2015

Michelle K. Lee  
*Director of the United States Patent and Trademark Office*